(12) United States Patent
Kubo et al.

(10) Patent No.: US 9,002,500 B2
(45) Date of Patent: Apr. 7, 2015

(54) NUMERICAL CONTROL DEVICE

(75) Inventors: Kosuke Kubo, Tokyo (JP); Masayoshi Sakakibara, Tokyo (JP); Masato Tsukamoto, Tokyo (JP); Nobuyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 379 days.

(21) Appl. No.: 13/643,413

(22) PCT Filed: Apr. 27, 2010

(86) PCT No.: PCT/JP2010/003003
§ 371 (c)(1),
(2), (4) Date: Oct. 25, 2012

(87) PCT Pub. No.: WO2011/135611
PCT Pub. Date: Nov. 3, 2011

(65) Prior Publication Data
US 2013/0184852 A1    Jul. 18, 2013

(51) Int. Cl.
*G06F 19/00*    (2011.01)
*G05B 19/4061*    (2006.01)

(52) U.S. Cl.
CPC ................... *G05B 19/4061* (2013.01)

(58) Field of Classification Search
CPC .................................. G05B 19/4061
USPC .......................... 700/169, 175–178, 250, 253
See application file for complete search history.

(56) References Cited

U.S. PATENT DOCUMENTS

| 4,446,525 A | * | 5/1984 | Hoch et al. | 700/181 |
| 4,723,219 A | * | 2/1988 | Beyer et al. | 700/190 |
| 5,079,713 A | * | 1/1992 | Kawamura et al. | 700/178 |
| 5,189,624 A | * | 2/1993 | Barlow et al. | 700/169 |

(Continued)

FOREIGN PATENT DOCUMENTS

| CN | 1620638 A | 5/2005 |
| DE | 4024307 A1 | 2/1992 |

(Continued)

OTHER PUBLICATIONS

Office Action, dated Feb. 11, 2014, issued by the German Patent and Trademark Office in counterpart German Patent Application No. 11 2010 005 521.1.

(Continued)

*Primary Examiner* — Ramesh Patel
(74) *Attorney, Agent, or Firm* — Sughrue Mion, PLLC; Richard C. Turner

(57) ABSTRACT

A numerical control device including a collision determining unit that detects a possibility of collision between a machine and an area set as an entry prohibited area; an operation-continuation instructing unit that instructs whether to continue an operation when the collision determining unit detects the possibility of collision and shaft movement is temporarily stopped; a machining-information storage unit that stores internal operation information of the numerical control device regarding the temporary stop when the operation-continuation instructing unit instructs continuation of the operation; and a collision-determination processing unit that invalidates a collision determination on the basis of the operation information stored in the machining-information storage unit when executing the same machining program the next and subsequent times.

6 Claims, 18 Drawing Sheets

(56) References Cited

U.S. PATENT DOCUMENTS

| | | | |
|---|---|---|---|
| 5,204,598 A * | 4/1993 | Torii et al. | 318/568.1 |
| 5,304,906 A * | 4/1994 | Arita et al. | 318/568.16 |
| 5,339,015 A * | 8/1994 | Hanaki et al. | 318/600 |
| 5,453,933 A * | 9/1995 | Wright et al. | 700/181 |
| 5,544,046 A * | 8/1996 | Niwa | 700/159 |
| 5,793,635 A * | 8/1998 | Niwa | 700/192 |
| 6,157,869 A * | 12/2000 | Matsumura et al. | 700/178 |
| 6,377,869 B1 * | 4/2002 | Watanabe et al. | 700/245 |
| 7,318,767 B2 * | 1/2008 | Simakov et al. | 451/5 |
| 8,326,448 B2 * | 12/2012 | Schneider | 700/110 |
| 8,478,439 B2 * | 7/2013 | Nishibashi | 700/192 |
| 2003/0060909 A1 | 3/2003 | Yamato | |
| 2005/0113958 A1 | 5/2005 | Shimizu et al. | |

FOREIGN PATENT DOCUMENTS

| | | | |
|---|---|---|---|
| DE | 37 86 753 T2 | 10/1993 | |
| JP | 322106 A | 1/1991 | |
| JP | 5500543 A | 2/1993 | |
| JP | 9230918 A | 9/1997 | |
| JP | 2000284819 A | 10/2000 | |
| JP | 2003108205 A | 4/2003 | |
| JP | 2003271215 A | 9/2003 | |
| JP | 2005321890 A | 11/2005 | |
| WO | 9202670 A1 | 2/1992 | |

OTHER PUBLICATIONS

Pritschow, G., et al., "Kollisionsüberwachung: Benutzerführung mittels XML," wt Werkstattstechnik online, Issue 1991 (2001), vol. 11, pp. 698-702.

International Search Report (PCT/ISA/210 and PCT/ISA/220) dated Aug. 3, 2010 issued by the International Searching Authority in counterpart International Application No. PCT/JP2010/003003.

Written Opinion (PCT/ISA/237) of the International Searching Authority dated Aug. 3, 2010 in counterpart International Application No. PCT/JP2010/003003.

Office Action dated Aug. 29, 2014, issued by the State Intellectual Property Office of P.R.China in counterpart Chinese Application No. 201080066490.5.

* cited by examiner

FIG. 2

```
   :
UNo.1
SNo.1
T SPOT M6
M847

:
G0 X□□. Z△△.
G1 Z□□

:
G0 X□□Z△△
SNo.2
T DRILL M6
M846

:
G0 X□□. Z△△.
G1 Z□□

:
G0 X□□Z△△
SNo.3
T□□T△△M6
M846
```

COLLISION-DETERMINATION
INVALIDATION COMMAND

NO. 00 (COORDINATE SHIFT)
X  0.
Y  0.
Z  0.
B  0.
C  0.

MACHINE POSITION
X  0.
Y  0.
Z  0.
B  0.
C  0.
W

NUMERICAL CONTROL DEVICE

TECHNICAL FIELD

The present invention relates to a numerical control (hereinafter, referred to as NC) device, and particularly, to an interference check of a machining program during an operation such as test cutting or first machining.

BACKGROUND ART

There has been widely known a method of setting an entry prohibited area in view of shapes of machines, tools, jigs, and materials, and the like in advance and performing an interference check using the entry prohibited area to prevent interference of a machine and a tool, a tool and another tool, a tool and a jig, a tool and a material, or other elements during machining according to a machining program in an automatic operation of operating an NC working machine by the machining program to perform machining on a component (an operation of reading the machining program stored in a memory and automatically executing the machining program) (see Patent Document 1 for instance).

Also, there has been proposed a method in which an interference check is performed by simulating a machining program block by block while graphically displaying a machined state of a material by a simulation. Any one of continuation, low-speed switching, and temporary stop of machining is set for a block of the machining program in which an interference error occurs, in a case where a detected interference portion is an entrance allowed area in a real machine. An operation according to the setting is performed if the real machine reaches the interference block during test cutting (see Patent Document 2 for instance).

CITATION LIST

Patent Document

Patent Document 1: JP-A-H09-230918
Patent Document 2: JP-A-2003-271215

DISCLOSURE OF THE INVENTION

Problem that the Invention is to Solve

However, in a conventional NC device as disclosed in Patent Document 1, which performs an interference check during an automatic operation, in a case of performing an interference check on a machine, a tool, a jig, or a material during an automatic operation, each entry prohibited area is represented by using a simple shape into which the machine, the tool, the jig, or the material which becomes a subject can be fit. For this reason, even an entry allowable area which can not actually interfere may be set as an entry prohibited area. Accordingly, it is sometimes excessively determined that entry is prohibited.

Also, an interference check method according to a simulation which does not use a real machine as disclosed in Patent Document 2 has the following problems.

(1) It is very difficult to prepare 3D shape data accurately representing the shape of a machine, a tool, a jig, or a material of the real machine.

(2) A machine, a tool, a jig, or a material of the real machine may not be reproduced completely, and an unexpected operation may occur during test cutting in the real machine, resulting in a collision.

(3) If a possibility of collision is detected in an entry prohibited area of a machine, a tool, a jig, or a material during test cutting in a real machine, in order to correct a machining program, it is necessary to edit the program after an automatic operation completely stops. For this reason, test cutting after the program editing needs to be performed again from the beginning. Therefore, extra time of the automatic operation is necessary.

The present invention was made to solve the above-mentioned various problems, and an object of the present invention is to obtain an NC device which can represent each entry prohibited area by using a simple shape into which a subject such as a machine, a tool, a jig, or a material can be fit and perform an interference check using the entry prohibited area during test cutting or first machining such that it is possible to easily continue an operation even if shaft movement temporarily stops.

Another object of the present invention is to obtain an NC device which prevents temporary stop of an automatic operation from excessively occurring when the automatic operation is performed after an interference check.

Means for Solving the Problem

An NC device of the present invention is a numerical control device having a function of preventing machine collision, the NC comprising: a collision determining unit that detects a possibility of collision between a machine and an area set as an entry prohibited area; and an operation-continuation instructing unit that instructs whether to continue an operation when the collision determining unit detects the possibility of collision and shaft movement is temporarily stopped.

Further, an NC device of the present invention is a numerical control device having a function of preventing machine collision, the numerical control device comprising: a collision determining unit that detects a possibility of collision between a machine and an area set as an entry prohibited area; an operation-continuation instructing unit that instructs whether to continue an operation when the collision determining unit detects the possibility of collision and shaft movement is temporarily stopped; a machining-information storage unit that stores internal operation information of the numerical control device regarding the temporary stop when the operation-continuation instructing unit instructs continuation of the operation; and a collision-determination processing unit that invalidates a collision determination on the basis of the operation information stored in the machining-information storage unit when executing the same machining program the next and subsequent times.

Further, the NC device of the present invention further comprises a screen display processing unit that displays a portion of the machining program in which the collision determination has been invalidated such that the portion is distinguished from the other portions by at least one or a combination of an icon, a display color and a font style.

Further, the NC device of the present invention further comprises an erasing unit that automatically erases the operation information stored in the machining-information storage unit when any one of a machining program including a portion in which the collision determination has been invalidated, a tool corresponding to the machining program, a jig corresponding to the machining program and an original point coordinate corresponding to the machining program is changed.

Further, according to the NC device of the present invention, the collision-determination processing unit has a function of invalidating the collision determination according to a kind of interference check.

Advantage of the Invention

According to the present invention, it is possible to represent each entry prohibited area by using a simple shape into which a subject such as a machine, a tool, a jig, or a material can be fit and perform an interference check using the entry prohibited area during test cutting or first machining, such that it is possible to easily continue an operation even if shaft movement temporarily stops. Also, when a possibility of collision is detected in a machinable area during the automatic operation, since it is unnecessary to completely stop the automatic operation in invalidating the collision determination, it is unnecessary to perform the automatic operation again from the beginning Therefore, there is an effect of a time reduction in working time.

Further, according to the present invention, with respect to detection of a possibility of collision occurring in a machinable area during the automatic operation, it is possible to easily invalidate the collision determination at the detected portion of the machining program, and thus there is an effect of preventing temporary stop of the automatic operation from excessively occurring during the next automatic operation.

Furthermore, according to the present invention, since an icon, display color, font style, or the like of a portion of the machining program with operation information written therein can be changed, there is an effect that it is easy to distinguish the corresponding portion from the other portions, and determine a collision-determination invalidation portion.

Moreover, according to the present invention, even if an interference portion is generated due to a correction of the machining program including a portion in which collision determination has been invalidated, or the like, since the collision determination is validated and an interference check is performed, it is safe.

BRIEF DESCRIPTION OF DRAWINGS

FIG. 2 is a view illustrating an example of a machining program including a collision-determination invalidation command written therein according to the first embodiment of the present invention.

FIG. 8 is a view illustrating original point coordinates according to the second embodiment of the present invention.

BEST MODE FOR CARRYING OUT THE INVENTION

First Embodiment
Hereinafter, a first embodiment of an NC device according to the present invention will be descried in detail with reference to FIGS. 1 to 6.

Figure 1:
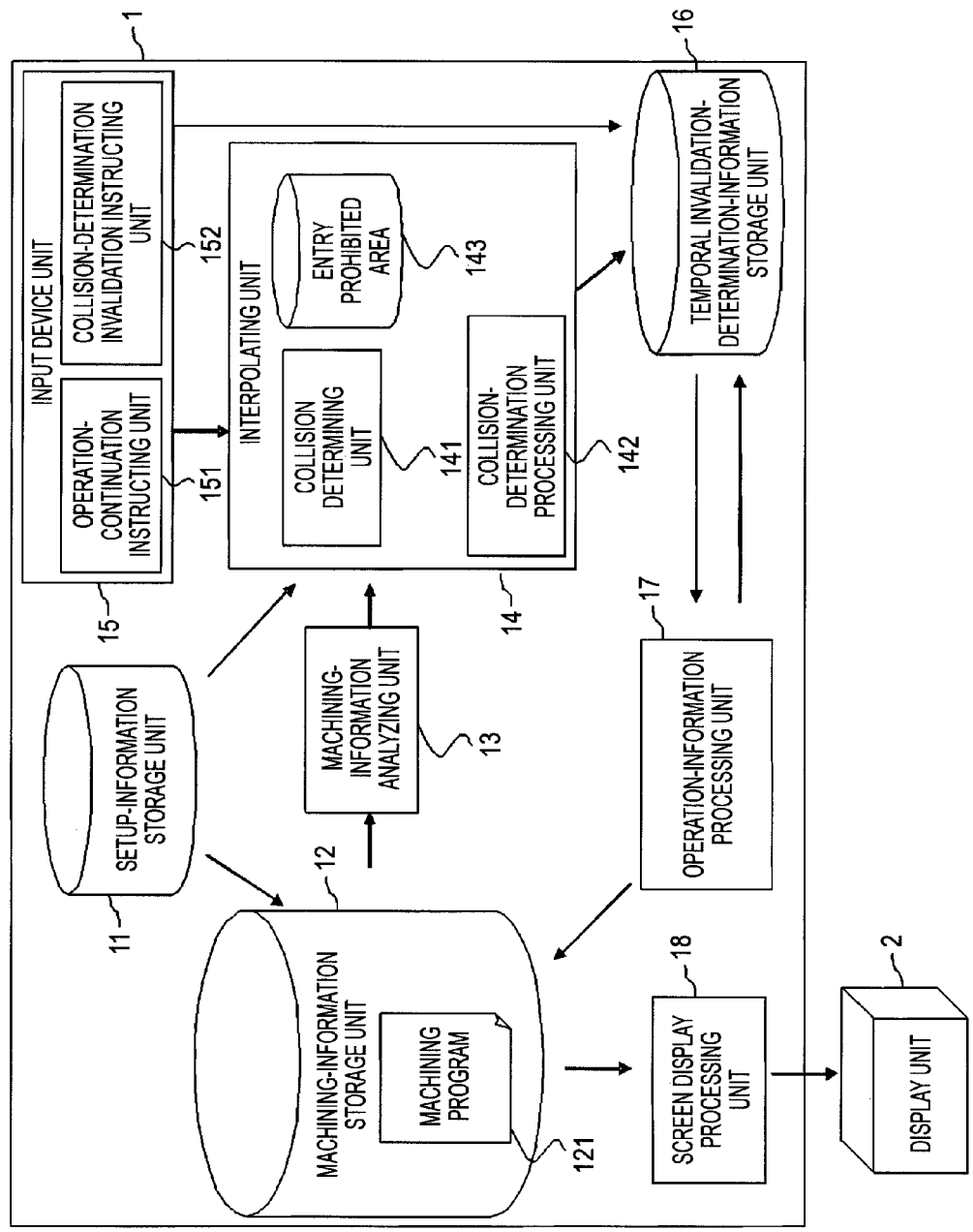
FIG. 1 is a block diagram illustrating a configuration of an NC device according to a first embodiment of the present invention.

FIG. 1 is a block diagram illustrating a configuration of an NC device according to an embodiment of the present invention. In FIG. 1, reference numeral 1 represents an NC device, reference numeral 11 represents a setup-information storage unit for storing information of shapes of machines, tools, jigs, and materials defined by a worker, reference numeral 12 represents a machining-information storage unit for storing a machining program 121, reference numeral 13 represents a machining-information analyzing unit for reading the machining program 121 and generating data necessary for interpolation by an interpolating unit 14, and reference numeral 14 represents the interpolating unit for performing an interpolating process according to the data generated by the machining-information analyzing unit 13 and outputting interpolated data to an output unit (not shown). Also, the interpolating unit 14 includes a collision determining unit 141 for determining a possibility of machine collision according to an entry prohibited area 143 defined on the basis of the shape information on machines, tools, jigs, and materials stored in the setup-information storage unit 11 during execution of the machining program.

An input device unit 15 includes an operation-continuation instructing unit 151 for instructing whether to continue an operation according to determination of the worker when the collision determining unit 141 detects a possibility of collision and shaft movement temporarily stops. When the collision determining unit 141 detects a possibility of collision and shaft movement temporarily stops, in a case where the worker instructs operation continuation by the operation-continuation instructing unit 151, a collision-determination invalidation instructing unit 152 included in the input device unit 15 recognizes that, and writes a collision-determination invalidation command to a machining program portion in which the operation can be continued by the operation-continuation instructing unit 151, in a temporal invalidation-determination-information storage unit 16 each time the shaft movement temporarily stops. Each time the collision-determination invalidation command is stored in the temporal invalidation-determination-information storage unit 16, an operation-information processing unit 17 writes the collision-determination invalidation command stored in the temporal invalidation-determination-information storage unit 16 before a program row of the machining program portion in which operation continuation is possible, as shown in FIG. 2. The example shown in FIG. 2 is an example of a case of an EIA machining program, and uses M847 as the collision-determination invalidation command. However, the present invention is not limited thereto.

The next and subsequent times the same machining program is executed, when the machining program portion with the collision-determination invalidation command given thereto is reached, the collision-determination processing unit 142 of the interpolating unit 14 invalidates the collision determination of the collision determining unit 141 on the machines, the tools, the materials, and the jigs in the machining program portion in which the possibility of collision has been detected. The collision-determination invalidating process may make the collision determining unit 141 not operate or may invalidate a collision determination result of the collision determining unit 141 (that is, not outputting the collision determination result to the output unit or the like).

Figure 3:
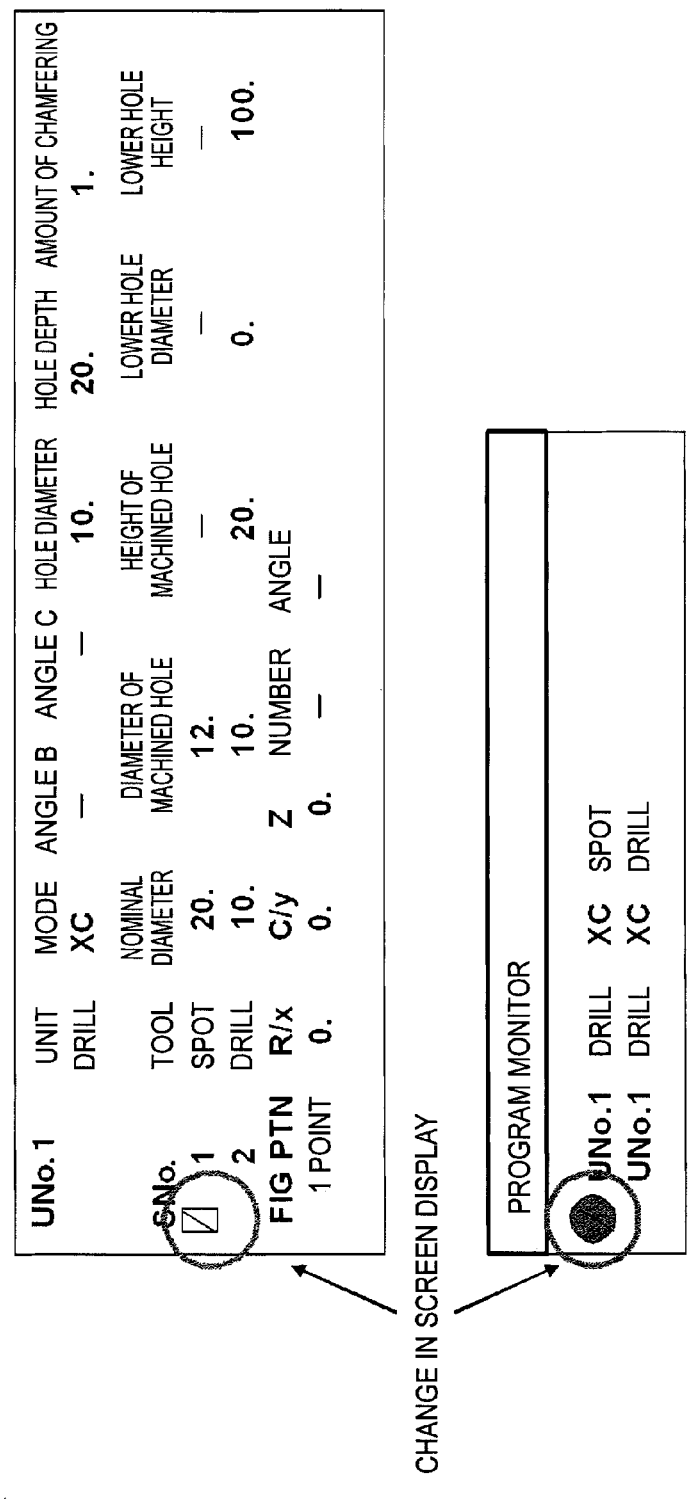
FIG. 3 is a view illustrating an edit screen of an interactive program according to the first embodiment of the present invention.
Figure 4:
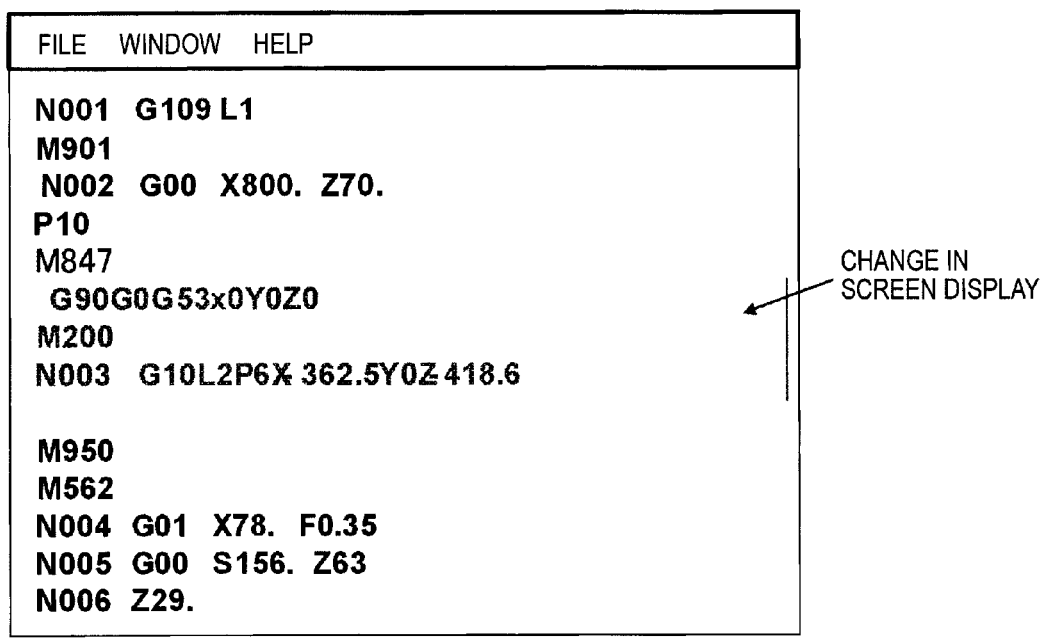
FIG. 4 is a view illustrating an edit screen of an EIA machining program according to the first embodiment of the present invention.

As shown in FIGS. 3 and 4, a screen display processing unit 18 performs screen display on a display unit 2 such that the machining program portion in which the collision determination has been invalidated by the collision-determination invalidation command is distinguished from the other portions by at least one or a combination of an icon, display color, and font style of the machining program portion.

FIG. 3 shows an automatic programming type edit screen for interactively generating the machining program, and in the edit screen, the display of the machining program portion in which the collision determination has been invalidated by the collision-determination invalidation command is distinguished from the other portions by the screen display processing unit 18. FIG. 4 shows an EIA program edit screen in which display of a machining program portion in which collision determination has been invalidated by a collision-determination invalidation command is distinguished from the other portions by the screen display processing unit 18.

The NC device according to the first embodiment is configured as described above, and a hardware configuration of the NC device is the same as a configuration of a general NC device configured by a CPU, a memory, and the like. The machining-information analyzing unit 13, the interpolating unit 14, the collision-determination invalidation instructing unit 152 of the input device unit 15, the operation-information processing unit 17, the screen display processing unit 18, and the like are configured by software.

Further, the operation-continuation instructing unit 151 of the input device unit 15 is configured by hardware such as a keyboard and a mouse for inputting whether to continue the automatic operation on the basis of an interference error message displayed on the display unit 2 when the collision determining unit 141 detects a possibility of collision and the shaft movement temporarily stops, and software for processing the input signal.

Figure 5:
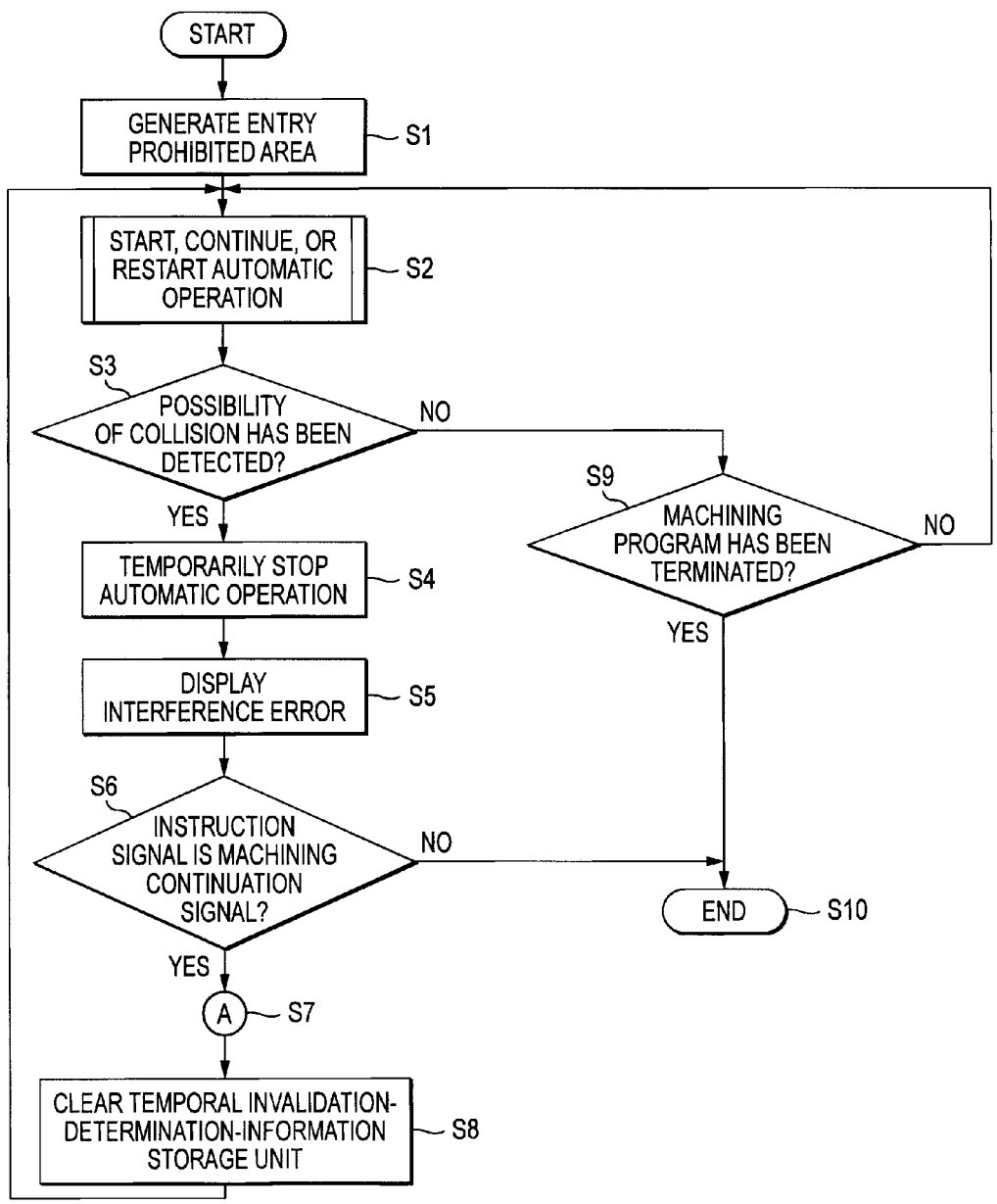
FIG. 5 is a flow chart illustrating an operation of the NC device according to the first embodiment of the present invention.
Figure 6:
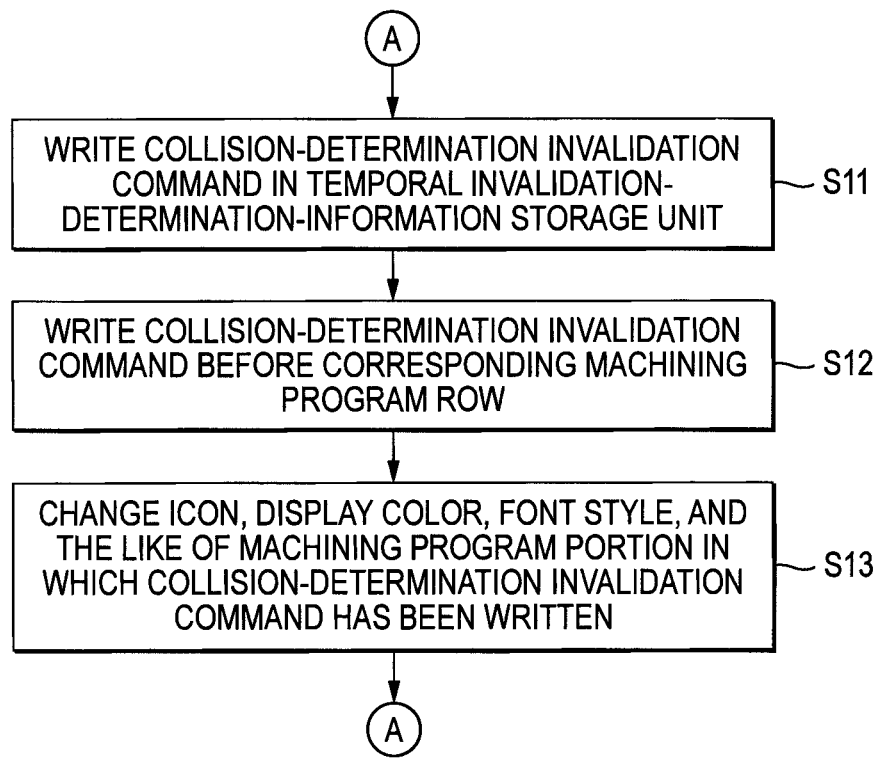
FIG. 6 is a view illustrating a sub routine of FIG. 5 according to the first embodiment of the present invention.

FIGS. 5 and 6 are flow charts illustrating a process procedure regarding the NC device of the first embodiment. Hereinafter, an operation of the first embodiment will be described according to those the charts.

The flow charts show a case during an operation such as test cutting, or first machining.

In FIG. 5, first, in STEP S1, the interpolating unit 14 generates an entry prohibited area 143 on the basis of the shape information on machines, tools, jigs, and materials input to the setup-information storage unit 11 by the worker.

If the automatic operation starts in STEP S2, the machining-information analyzing unit 13 analyzes the data of the machining program 121 of the machining-information storage unit 12. In STEP S3, the collision determining unit 141 of the interpolating unit 14 uses the entry prohibited area 143 to determine whether a possibility of collision has been detected. The entry prohibited area which the collision determining unit 141 uses for collision determination may be represented in a 2D shape or a 3D shape. This has no influence on the features of the present invention. Also, the entry prohibited area shape does not need to be set to almost the same shape as that of a chuck, a tool, or the like, and a simple shape is enough.

In a case where it is determined in STEP S3 that a possibility of collision has not been detected, the process proceeds to STEP S9 in which the interpolating unit 14 determines whether the machining program 121 is in progress. In a case where the machining program 121 is in progress, the process proceeds to STEP S2 in which the automatic operation is continued. In a case where the machining program 121 has been completed to the end, the process proceeds to STEP S10 in which the interpolating unit 14 stops output of interpolation to completely stop the automatic operation.

If it is determined in STEP S3 that a possibility of collision has been detected, the collision determining unit 141 temporarily stops the automatic operation in STEP S4, and performs display of an interference error on a display part of a display unit 5 (display for informing that the shaft movement has temporarily stopped, and display for making the worker select whether to continue the automatic operation).

Next, in STEP S6, the interpolating unit 14 determines whether an instruction signal input from the operation-continuation instructing unit 151 of the input device unit 15 by the worker is a machining continuation signal. In a case where it is determined that the instruction signal is a machining stop signal, the process proceeds to STEP S10 in which the interpolating unit 14 stops the output of interpolation and completely stops the automatic operation. In a case where it is determined that the instruction signal is a machining continuation signal, a process of STEP S7 is performed.

Also, in a case where the worker determines that the machining continuation is impossible, the automatic operation stops, and the machining program contents of the portion in which the possibility of collision has been detected are corrected such that the machining continuation is possible.

The process of STEP S7 will be described according to the flow of FIG. 6. That is, in STEP S11, the collision-determination invalidation instructing unit 152 writes a collision-determination invalidation command for the machining program portion in which operation continuation is possible by the operation-continuation instructing unit 151, in the temporal invalidation-determination-information storage unit 16. In STEP S12, the operation-information processing unit 17 writes the collision-determination invalidation command stored in the temporal invalidation-determination-information storage unit 16 before the program row of the corresponding machining program portion, as shown in FIG. 2. In STEP S13, the screen display processing unit 18 changes and displays an icon, display color, font style, and the like of the machining program portion in which the collision determination has been invalidated according to the collision-determination invalidation command, as shown in FIGS. 3 and 4.

After the process of STEP S7 finishes, in STEP S8, the operation-information processing unit 17 clears the collision-determination invalidation command stored in the temporal invalidation-determination-information storage unit 16, and in STEP S2, the automatic operation restarts.

After the execution process of the machining program 121 is completely terminated, if the automatic operation is performed using the machining program with the collision-determination invalidation command written therein, although the automatic operation has temporarily stopped at the portion having the possibility of collision in the previous program execution, in a case where the collision-determination invalidation command has been written at the portion, since the collision-determination processing unit 142 invalidates the collision determination on machines, tools, materials, and jigs, at the machining program portion in which the possibility of collision has been detected, even if the portion having the possibility of collision and the collision-determination invalidation command written therein is executed, the automatic operation does not temporarily stop.

Therefore, according to the first embodiment, even if each entry prohibited area is represented in a simple shape into which the subjects such as machines, tools, jigs, or materials can be fit, an interference check is performed using the entry prohibited area during test cutting or first machining and the shaft movement temporarily stops, it is possible to easily continue the operation.

Also, when a possibility of collision is detected in a machinable area during the automatic operation, since it is unnecessary to completely stop the automatic operation in invalidating the collision determination, it is unnecessary to perform the automatic operation again from the beginning, and thus it is possible to reduce the working time.

Further, with respect to detection of a possibility of collision occurring in a machinable area during the automatic operation, it is possible to easily invalidate the collision determination of the detected portion of the machining program and thus there is an effect of preventing temporary stop of the automatic operation or interference error display from excessively occurring during the next automatic operation.

Furthermore, since the icon, display color, font style, and the like of the machining program portion having the operation information (collision-determination invalidation command) written therein are changed and displayed, it becomes easy to distinguish the portion in which the collision determination has been invalidated from the other portions.

Second Embodiment

Next, a second embodiment of the present invention will be described with reference to FIGS. 7 to 11.

In the above-mentioned first embodiment, the operation information stored by the machining-information storage unit 12 is a collision-determination invalidation command. However, even in cases of other operation information, for example, machining condition information such as the kind of interference check, current position coordinates of each shaft and original point information, which includes at least a machining-program row number, similarly to the first embodiment, implementation is possible.

Figure 7:
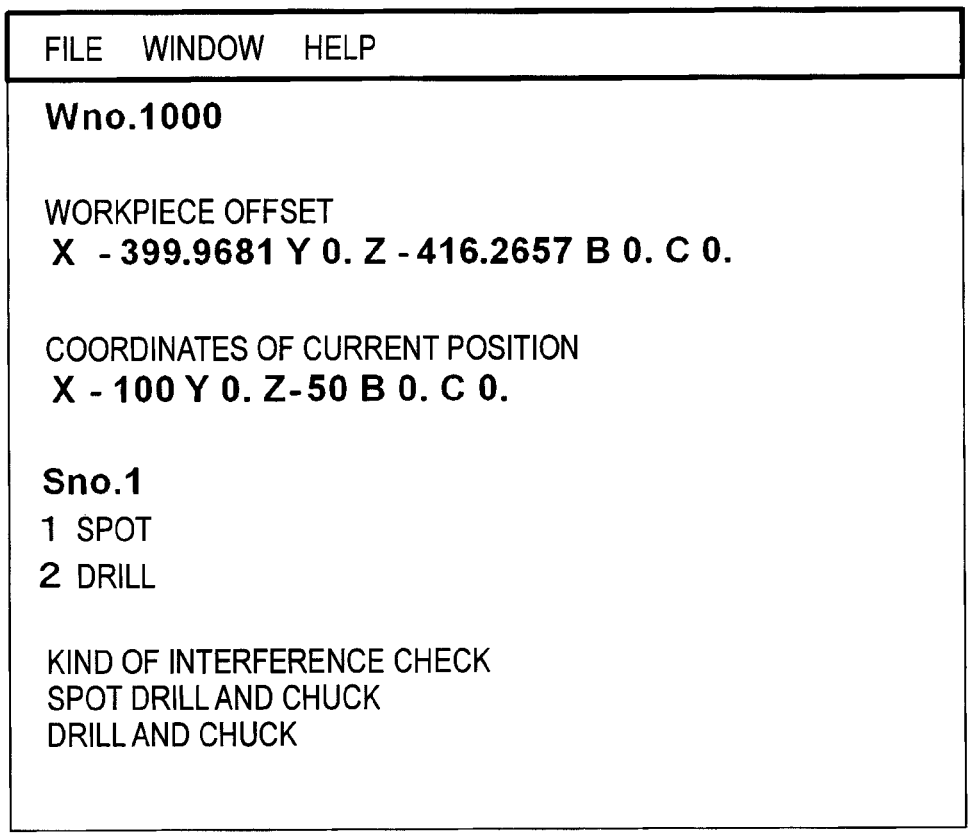
FIG. 7 is a view illustrating a machining-condition information file according to a second embodiment of the present invention.

The machining condition information is written in a machining-condition information file 122 of the machining-information storage unit 12, and the machining-condition information file 122 may be as shown in FIG. 7.

Further, the original point information may be original point coordinates for a machine, original point coordinates for a material defined by the worker, etc., and is stored in the setup-information storage unit 11, as shown in FIG. 8 for example. In FIG. 8, G54 to G59 are preparation command codes of setting 1 to 6 of coordinate systems for the original points of materials.

The current position coordinates of each shaft are coordinate values of each shaft stored in the interpolating unit 14 when the collision determining unit 141 detects a possibility of collision and the shaft movement temporarily stops.

Also, the kind of interference check is information specifying what are the entry prohibited areas in which the collision determining unit 141 has detected a possibility of collision, and may be information representing combinations of a chuck and a tool having collided with each other, a claw and a tool having collided with each other, and other elements having collided with each other. These information items are stored by the collision determining unit 141.

Also, in the above-mentioned first embodiment, whenever the automatic operation temporarily stops, the operation-information processing unit 17 writes the operation information (collision-determination invalidation command) in the machining program 121 of the machining-information storage unit 12. However, when the machining program is terminated, the operation-information processing unit 17 may write the operation information in the machining-information storage unit 12 at once.

Figure 9:
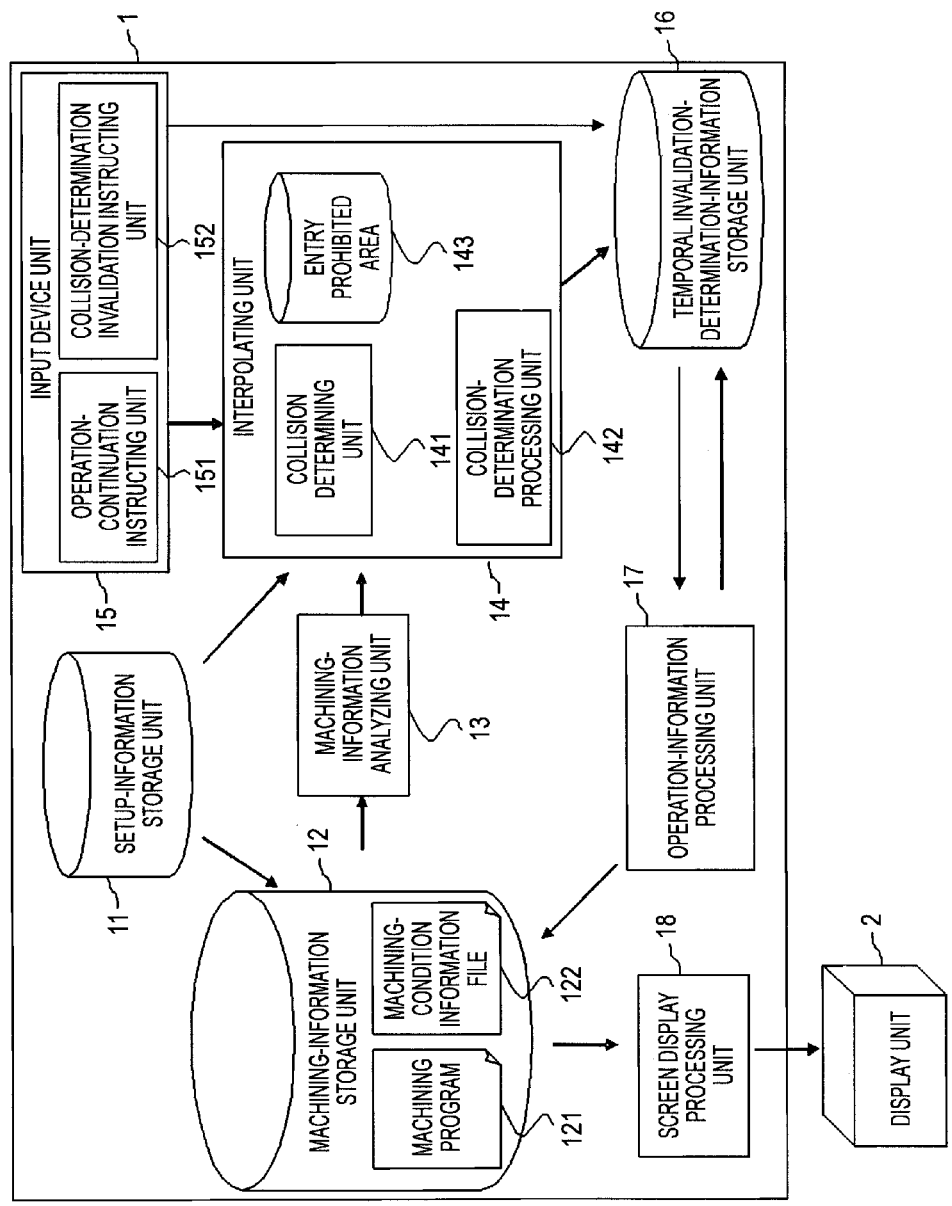
FIG. 9 is a block diagram illustrating a configuration of an NC device according to the second embodiment.

FIG. 9 is a block diagram illustrating a configuration of an NC device according to the second embodiment of the present invention. In FIG. 1, a process unit having the same function as that in the first embodiment is not shown, and parts having differences from the first embodiment will be described.

The collision-determination invalidation instructing unit 152 of the input device unit 15 temporarily writes the machining condition information of the machining program portion, in which the operation can be continued by the operation-continuation instructing unit 151 when the collision determining unit 141 detects a possibility of collision and the shaft movement temporarily stops, in the temporal invalidation-determination-information storage unit 16 each time the shaft movement temporarily stops.

Also, the operation-information processing unit 17 writes the machining condition information stored in the temporal invalidation-determination-information storage unit 16, in the machining-condition information file 122 of the machining-information storage unit 12 at once during the termination of the machining program. At this time, the operation-information processing unit 17 clears the machining condition information stored in the temporal invalidation-determination-information storage unit 16.

The next and subsequent times the same machining program is executed, if the machining program portion of the machining condition information written in the machining-condition information file 122 is reached, the interpolating unit 14 invalidates the collision determination on machines, tools, materials, and jigs in a machining program portion in which a possibility of collision has been detected by the collision-determination processing unit 142. The screen display processing unit 18 performs screen display on the display unit 2 such that the machining program portion corresponding to the machining condition information written in the machining-condition information file 122 is distinguished from the other portions by at least one or a combination of an icon, display color, and font style of the machining program portion.

Figure 10:
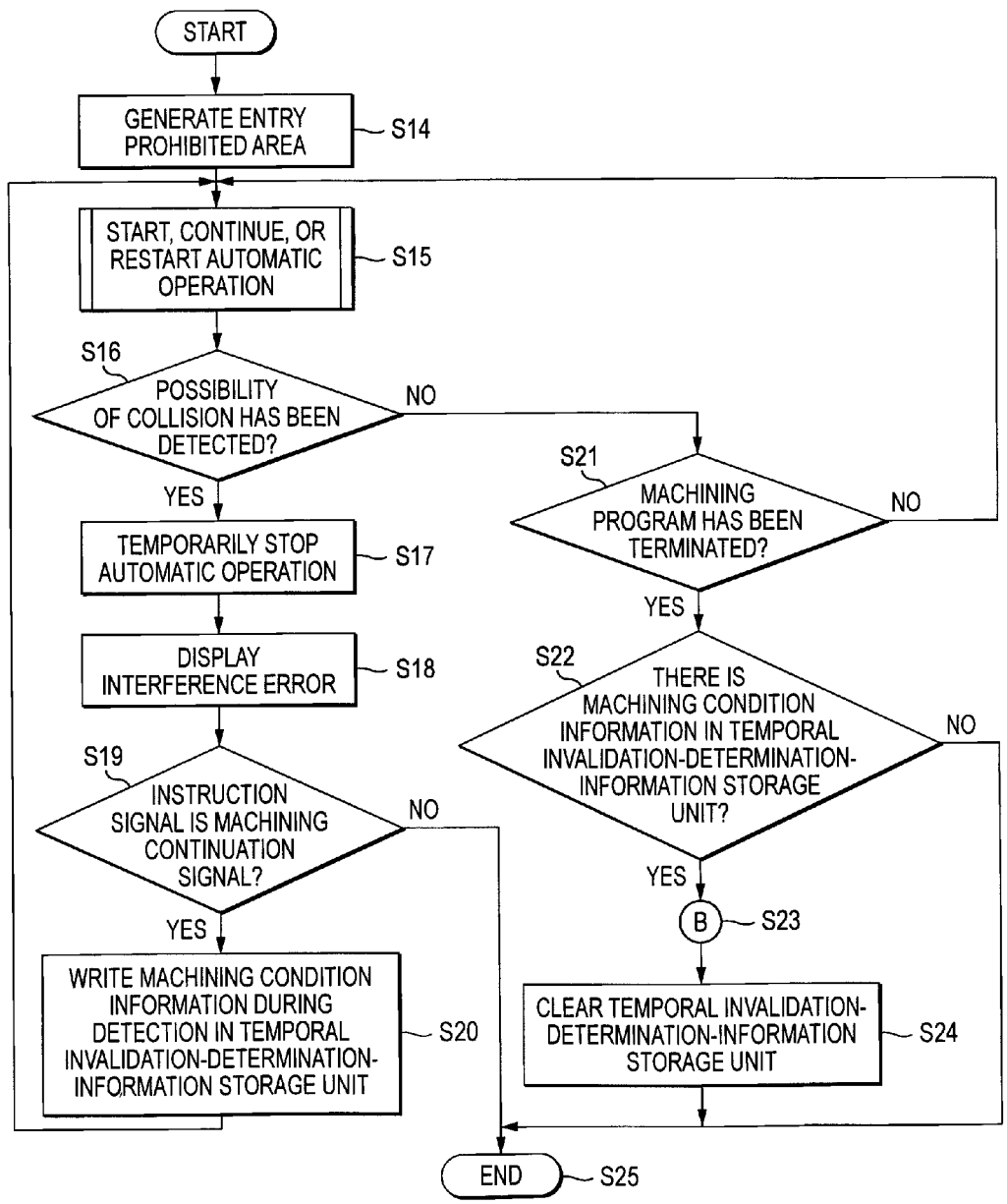
FIG. 10 is a flow chart illustrating an operation of the NC device according to the second embodiment of the present invention.
Figure 11:
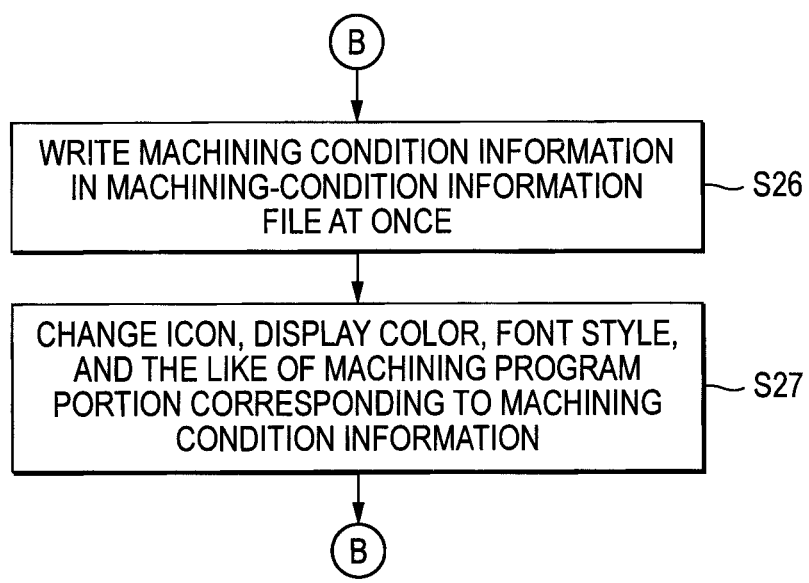
FIG. 11 is a view illustrating a sub routine of FIG. 10 according to the second embodiment of the present invention.

FIGS. 10 and 11 are flow charts illustrating a process procedure of the second embodiment. Hereinafter, an operation of the second embodiment will be described according to the flow charts.

In FIG. 10, the processes from STEP S14 to STEP S19 are the same as the processes from STEP S1 to STEP S6 in FIG. 5. In STEP S19, the interpolating unit 14 determines whether an instruction signal input from the operation-continuation instructing unit 151 of the input device unit 15 by the worker is a machining continuation signal. In a case where it is determined that the instruction signal is a machining stop signal, the process proceeds to STEP S25 in which the interpolating unit 14 stops the output of interpolation, and completely stops the automatic operation. In a case where it is determined that the instruction signal is a machining continuation signal, the process proceeds to STEP S20 in which the collision-determination invalidation instructing unit 152 writes the machining condition information (information such as the original point information, the current position coordinates of each shaft, the kind of interference check representing combinations of a chuck and a tool having collided with each other, and a claw and a tool having collided with each other, and other elements having collided with each other) of the machining program portion in which the operation can be continued by the operation-continuation instructing unit 151, in the temporal invalidation-determination-information storage unit 16. Next, in STEP S15, the automatic operation restarts.

In STEP S16, the collision determining unit 141 of the interpolating unit 14 determines whether a possibility of collision of machines, tools, jigs, and materials has been detected. In a case where any possibility of collision has not been detected, the process proceeds to STEP S21 in which it is determined whether the machining program is in process. In a case where the machining program 121 is in progress, in STEP S15, the automatic operation is continued. In a case where the machining program 121 has been completed to the end, the process proceeds to STEP S22 in which the collision-determination invalidation instructing unit 152 determines whether any machining condition information has been written in the temporal invalidation-determination-information storage unit 16 in the current automatic operation. In a case where there is machining condition information in the temporal invalidation-determination-information storage unit 16, the process proceeds to STEP S25 in which the interpolating unit 14 stops output of interpolation, and completely stops the automatic operation. In a case where there is no machining condition information in the temporal invalidation-determination-information storage unit 16, a process of STEP S23 is performed.

The process of STEP S23 will be described according to the flow of FIG. 11. In STEP S26, the operation-information processing unit 17 writes all of the machining condition information stored in the temporal invalidation-determination-information storage unit 16, in the machining-condition information file 122 of the machining-information storage unit 12 at once. In STEP S27, the screen display processing unit 18 changes and displays an icon, display color, font style, and the like of a machining-program row number corresponding to the machining condition information written in the machining-condition information file 122, as shown in FIGS. 3 and 4.

After the process of STEP S23, the operation-information processing unit 17 clears the machining condition information stored in the temporal invalidation-determination-information storage unit 16, and in STEP S25, the interpolating unit 14 stops the output of interpolation, and completely stops the automatic operation.

After the execution process of the machining program 121 is completely terminated, if the automatic operation is performed using the machining program 121, the machining-information analyzing unit 13 analyzes not only the machining program 121 but also the contents of the machining-condition information file 122, and in a case where there is machining condition information, such as the kind of interference check, the current position coordinates of each shaft, and the original point information, which includes the machining-program row number, stored in the machining-condition information file 122, the stored machining condition information is transmitted to a collision-determination processing unit 142.

As a result, although the automatic operation has temporarily stopped in the portion having the possibility of collision in the previous program execution, in a case where there is machining condition information, such as the kind of interference check, the current position coordinates of each shaft, and the original point information, which includes the machining-program row number, stored in association with the machining program portion having the possibility of collision in the machining-condition information file 122, since the collision-determination processing unit 142 invalidates the collision determination on machines, tools, materials, and jigs, at the machining program portion in which the possibility of collision has been detected, even if the portion having the possibility of collision is executed, the automatic operation does not temporarily stop.

As described above, according to the second embodiment, since the machining condition information (information regarding collision-determination invalidation) is stored in a separate file (machining-condition information file) without writing the information regarding collision-determination invalidation (collision-determination invalidation command) in the machining program, it is possible to invalidate the collision determination on machines, tools, jigs, and materials, only in machining portions intended by the worker.

In the above-mentioned first and second embodiments, the cases of using the collision-determination invalidation command or the machining condition information such as the kind of interference check, the current position coordinates of each shaft, and the original point information, which includes the machining-program row number, as the operation information for performing collision-determination invalidation have been described. However, it goes without saying that other information, for example, information such as a machining-program row number before a block of the machining program having a possibility of collision may also be used.

Third Embodiment

Next, a third embodiment of the present invention will be described with reference to FIGS. 12 to 15.

In the first and second embodiments, in a case of invalidating collision determination, the collision-determination processing unit 142 invalidates collision determination on all entry prohibited areas of machines, tools, jigs, and materials. However, in this case, an omission may occur in detecting a possibility of collision as in a situation described hereinafter.

Figure 12:
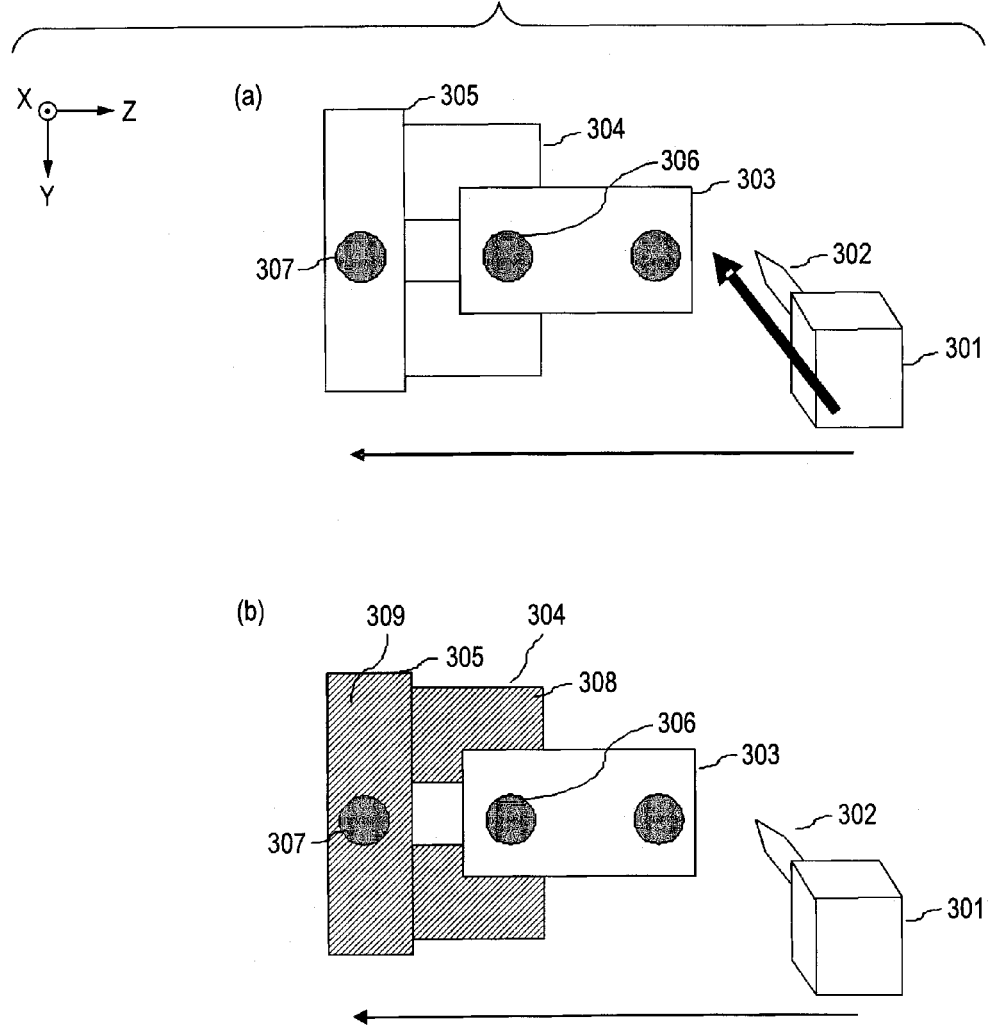
FIGS. 12a-b are views illustrating an example of a configuration of an NC working machine having an NC device according to a third embodiment of the present invention.
Figure 13:
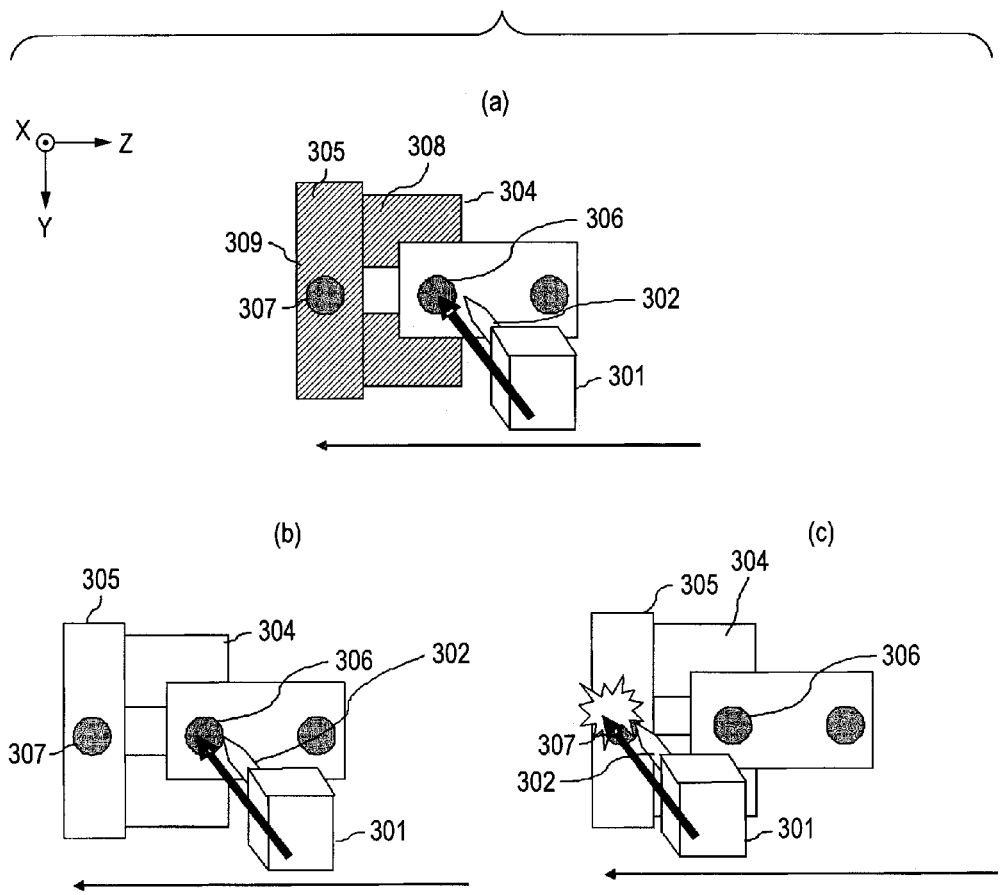
FIGS. 13a-c are views illustrating a case where an omission has occurred in detection of a possibility of collision, according to the third embodiment of the present invention.

FIGS. 12 and 13 are views illustrating a case where an omission occurs in determining a possibility of collision since collision determination on all entry prohibited areas is invalidated. Hereinafter, a description will be made with reference to FIGS. 12 and 13.

FIG. 12(a) shows a case where chuck claws 304 have hold and fixed a workpiece 303 and shows how to drill machined holes 306 and 307 in an arrow direction by a drill 302 of a tool rest 301 in a state in which a chuck 305 is stationary at a predetermined position. FIG. 12(b) shows entry prohibited areas 308 and 309 of the chuck claws 304 and the chuck 305 by oblique lines.

When the drill 302 has reached the entry prohibited area 308, which is a portion between the chuck claws 304, as shown in FIG. 13(a), if the worker determines that machining can be continued, the collision determining unit 122 invalidates all machine/tool/jig/material collision determinations as shown in FIG. 13(b).

Therefore, in the portion between the chuck claws 304, it is possible to perform drilling shown by a thick arrow at the drilling position of the machined hole 306 of FIG. 13(b). However, since the entry prohibited area 309 of the chuck 305 is also invalidated at the same time, the drill 302 and the chuck 305 collide at the drilling position of the machined hole 307 as shown in FIG. 13(c).

Figure 14:
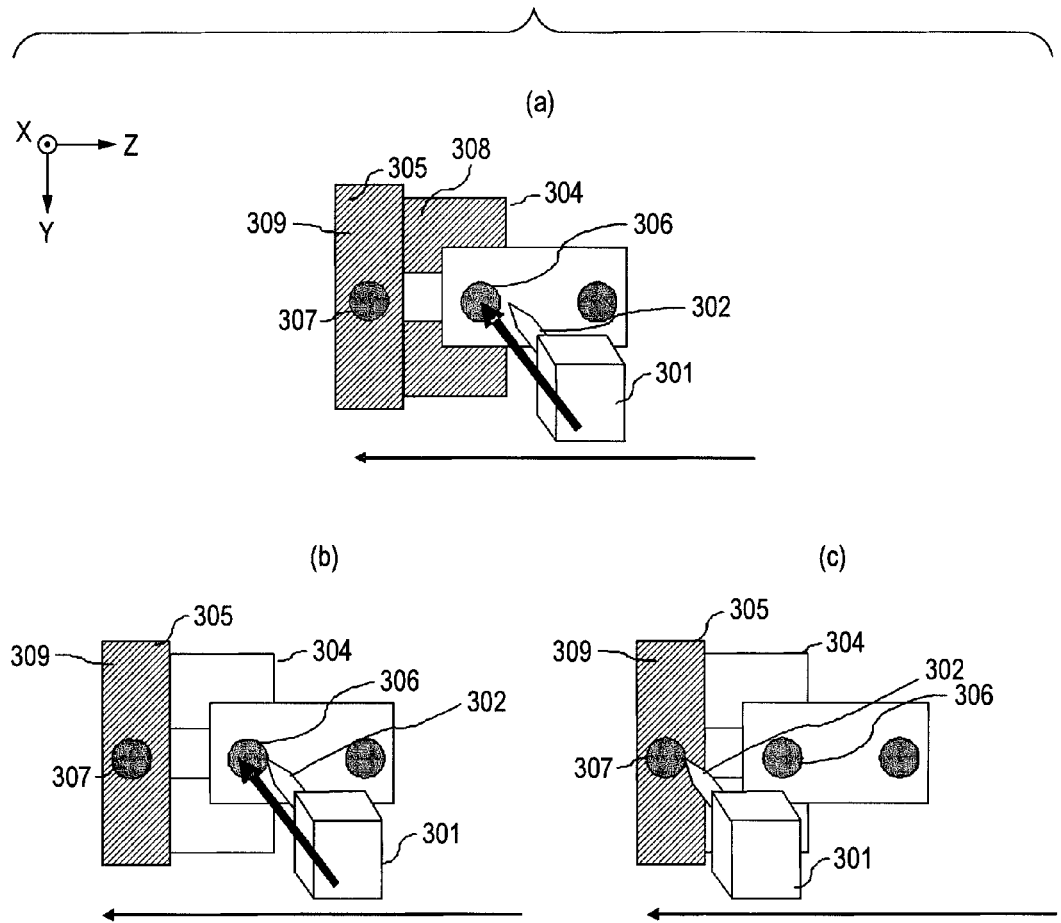
FIGS. 14a-c are views illustrating a case where the detection of a possibility of collision has been normally performed according to the third embodiment of the present invention.

For this reason, as shown in FIG. 14, the collision-determination processing unit 142 invalidates collision determinations on only workers intended subjects of the entry prohibited areas of machines, tools, jigs, and materials, to prevent an omission in detaining a possibility of collision.

That is, as shown in FIG. 14(a), when the drill 302 has reached to the entry prohibited area 308 which is a portion between the chuck claws 304, in a case where the worker determines that the machining can continue, the collision-determination processing unit 142 invalidates only a collision determination on the chuck claws 304 as shown in FIG. 14(b). Therefore, in the portion between the chuck claws 304, it is possible to perform drilling shown by a thick arrow at the drilling position of the machined hole 306. Next, when the drill 302 has reached the entry prohibited area 309 of the chuck 305 as shown in FIG. 14(c), since a possibility of collision is normally detected by the entry prohibited area 309, it is possible to prevent collision of the drill 302 and the chuck 305.

Figure 15:
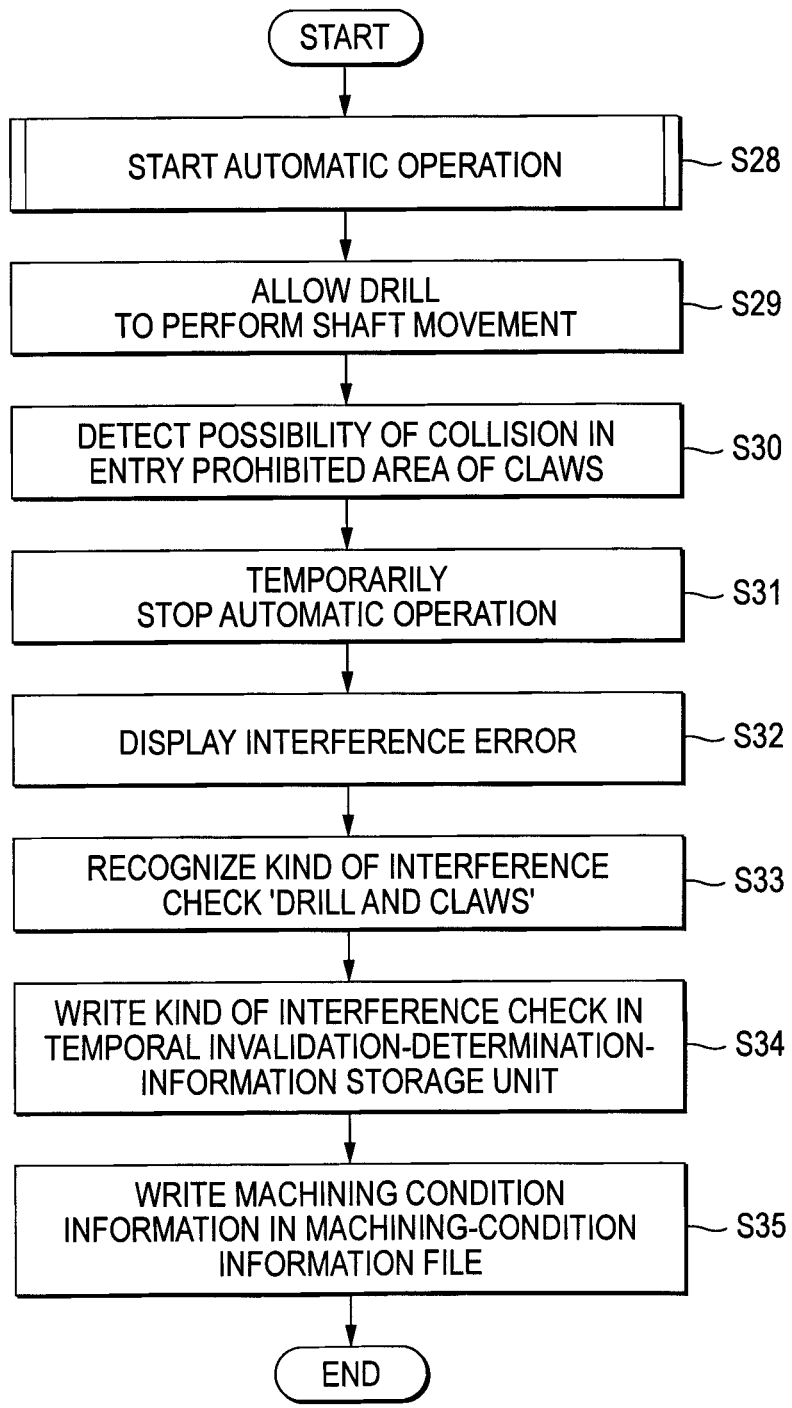
FIG. 15 is a flow chart illustrating an operation of the NC device according to the third embodiment of the present invention.

FIG. 15 is a flow chart illustrating a process procedure of the third embodiment. Hereinafter, an operation of the third embodiment will be described according to the flow chart.

If the automatic operation starts in STEP S28, the machining-information analyzing unit 13 analyzes the data of the machining program 121 of the machining-information storage unit 12. In STEP S29, the drill starts shaft movement by the interpolating unit 14.

If a possibility of collision in the entry prohibited area 143 of the claws is detected in STEP S30, in STEP S31, the automatic operation temporarily stops, and in STEP S32, an interference error is displayed. In STEP S33, the collision determining unit 141 recognizes what is the kind of interference check having temporarily stopped. In this case, the collision determining unit 141 recognizes that the kind of interference check is drill and claws.

In STEP S34, the collision-determination invalidation instructing unit 152 writes the information on the kind of interference check (combination information of the drill and the claws) in the temporal invalidation-determination-information storage unit 16, and in STEP S35, the operation-information processing unit 17 writes the kind of interference check in the machining-condition information file 122 of the machining-information storage unit 12. The other processes are the same as those of the second embodiment.

Therefore, the next and subsequent times the same machining program is executed, the collision-determination processing unit 142 invalidates collision determinations according to the kind of interference check written in the machining-condition information file 122.

Further, in the third embodiment, the next and subsequent times the same machining program is executed, in a case where the kind of interference check is a combination of the drill and the claws, the collision-determination processing unit 142 invalidates collision determinations, and in a case where the kind of interference check is chuck and drill, collision determinations are validated.

Fourth Embodiment

Next, a fourth embodiment of the present invention will be described with reference to FIGS. 16 to 18.

In the fourth embodiment, in a case where the worker changes any one of the machining program, tools, jigs, and original point information before or during execution of an automatic operation of a machining program set to invalidate collision determinations on entry prohibited areas of machines, tools, jigs, and materials, the machining-information storage unit 12 erases the operation information (the collision-determination invalidation command, the machining condition information such as the kind of interference check, the current position coordinates of each shaft, and the original point information including the machining-program row number, or the like), thereby validating the collision determinations.

Figure 16:
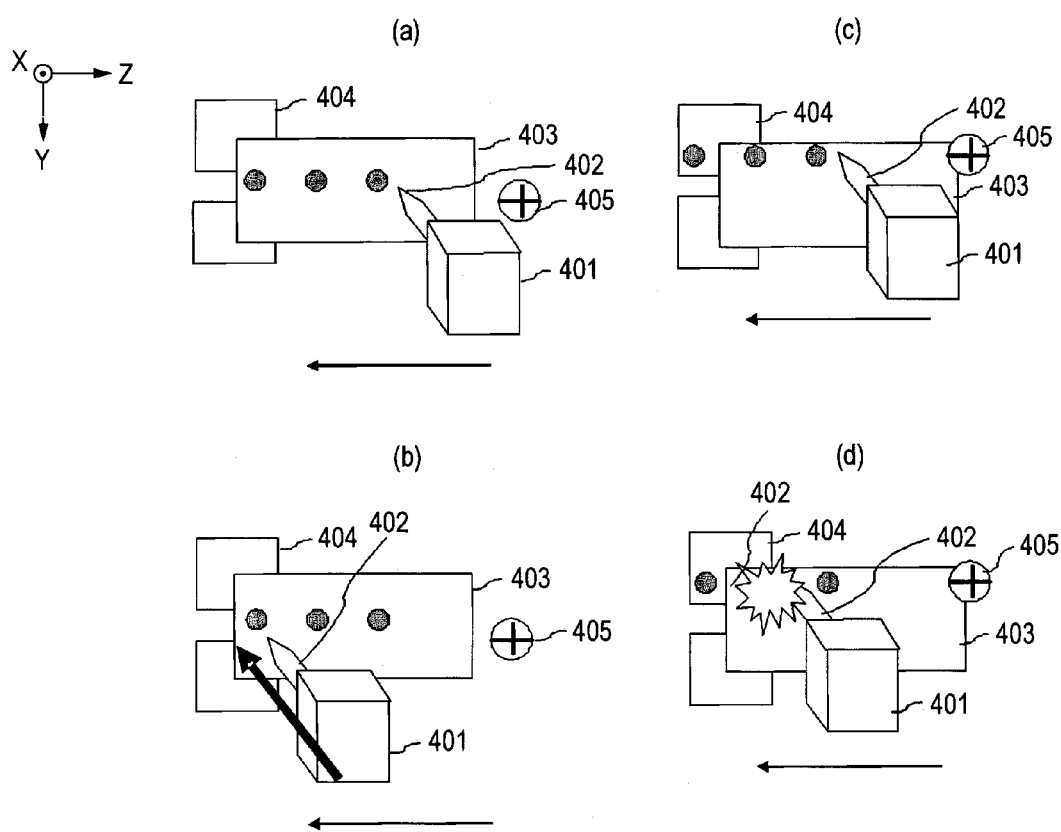
FIGS. 16a-d are views illustrating a case where an omission has occurred in detection of a possibility of collision, according to a fourth embodiment of the present invention.

FIG. 16 is a view illustrating a case where machine interference occurs since the worker changes the position of the original point for coordinates of materials with respect to the machining program 121 including the operation information stored in the machining-information storage unit 12. Hereinafter, a description will be made with reference to FIG. 16.

FIG. 16(a) shows a case where chuck claws 404 have hold and fixed a workpiece 403, and shows how to perform drilling in an arrow direction by a drill 402 of a tool rest 401. Reference numeral 405 represents the position of the original point for materials.

FIG. 16(b) shows a state where the drill 402 has moved to an end point. In a case where the original point 405 for materials is set to the position in FIG. 16(b), since the drill 402 can enter between the chuck claws 404, normally, the drill should temporarily stop by the interference check. However, since setting has been performed during test cutting or first machining such that collision determinations are invalidated, the drill 402 and the chuck claws 404 can perform machining without machine interference.

However, after setting is performed such that collision determinations are invalidated, if the worker moves the position of the original point 405 for materials in a negative Y axis direction and a negative Z axis direction (such that the drill 402 cannot enter between the chuck claws 404 so as not to perform machining) as shown in FIG. 16(c), when machining as shown in FIG. 16(a) is performed, the drill 402 moves to the chuck claws 404 as shown in FIG. 16(d), such that the drill 402 and the chuck claws 404 collide.

This is an example of a case where the worker has changed the position of the original point for materials. However, even in a case of changing the machining program or the like, similarly, a case where a machine and a tool, a tool and another tool, a tool and a jig, a tool and a material, or other elements interfere with each other may occur.

Figure 17:
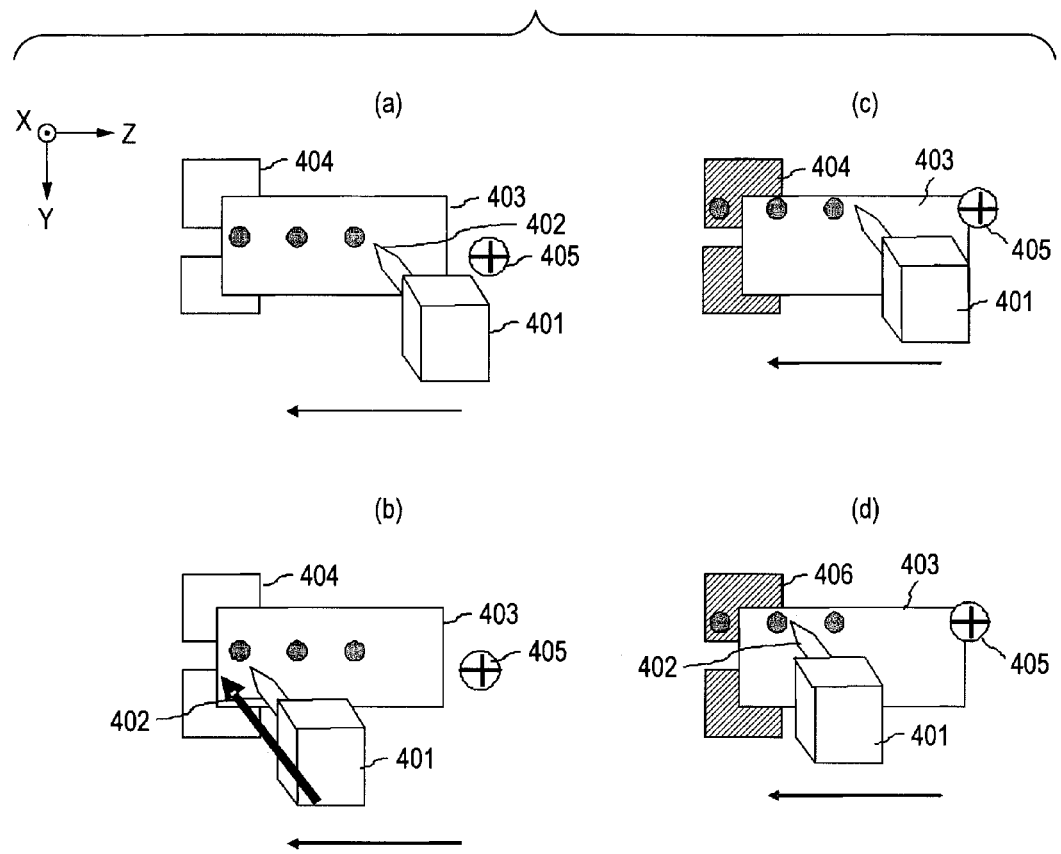
FIGS. 17a-d are views illustrating a case where the detection of a possibility of collision has been normally performed according to the fourth embodiment of the present invention.

For this reason, as shown 17, in a case where the worker has changed the position of the original point 405 for materials after setting was performed such that collision determination are invalidated, the operation information (original point information including a machining-program row number in the case shown in FIG. 17) is erased such that the collision determinations are validated. Therefore, machine interference is prevented.

FIGS. 17(a) and 17(b) are the same as FIGS. 16(a) and 16(b), and thus will not be described. Oblique lines 406 in FIG. 17(c) represent entry prohibited areas of the chuck claws 404. As shown in FIG. 17(c), after setting was performed such that collision determinations are invalidated, if the worker moves the position of the original point 405 for materials in the negative Y axis direction and the negative Z axis direction, the operation information (information on the original point for materials including the machining-program row number in the case shown in FIG. 17) stored in the machining-information storage unit 12 is erased. Therefore, the collision determination on the chuck claws 404 is validated. As a result, even if machining as shown in FIG. 17(a) is performed, as shown in FIG. 17(d), it is possible to detect a possibility of collision by an entry prohibited area 406, and thus it is possible to prevent machine interference of the drill 402 and the chuck claws 404.

Figure 18:
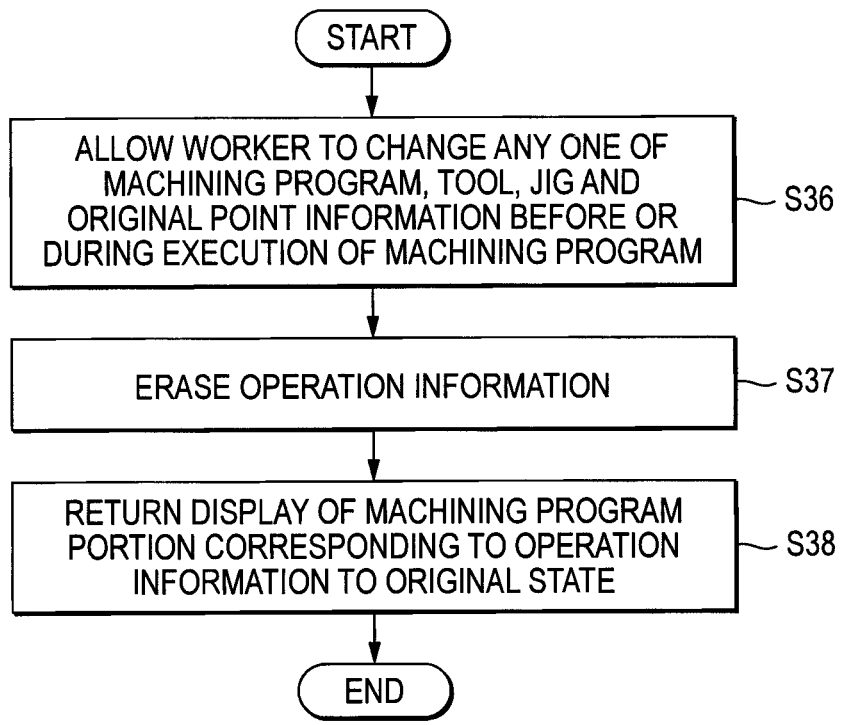
FIG. 18 is a flow chart illustrating an operation of an NC device according to the fourth embodiment of the present invention.

FIG. 18 is a flow chart illustrating a process procedure of the fourth embodiment. Hereinafter, an operation of the fourth embodiment will be described according to the flow chart.

In other words, after setting is performed such that collision determinations are invalidated, if the worker changes any one of the machining program, a tool, a jig, and the original point information before or during execution of an automatic operation in STEP S36, in STEP S37, the interpolating unit 14 recognizes it, and the collision-determination invalidation instructing unit 152 writes an erase command in the temporal invalidation-determination-information storage unit 16. Next, on the basis of the erase command, the operation-information processing unit 17 erases the operation information (information on the original point for materials including the machining-program row number in the case shown in FIG. 17) stored in the machining-information storage unit 12, and clears the erase command of the temporal invalidation-determination-information storage unit 16. In a case where the collision-determination invalidation command is inserted in the machining program 121, the collision-determination invalidation command in the machining program of the machining-information storage unit 12 is erased.

In the fourth embodiment, the interpolating unit 14, the collision-determination invalidation instructing unit 152, the temporal invalidation-determination-information storage unit 16, and the operation-information processing unit 17 configures a means for erasing the erase command.

Therefore, the collision determination having been invalidated is validated, and thus it is possible to prevent machine interference.

In a case where the original point information or the like changes during the automatic operation, the collision-determination processing unit 142 immediately validates the collision determination in the interpolating unit 14, and the collision-determination invalidation instructing unit 152 writes the erase command in the temporal invalidation-determination-information storage unit 16. Next, on the basis of the erase command, the operation-information processing unit 17 erases the operation information (information on the original point for materials including the machining-program row number in the case shown in FIG. 17) stored in the machining-information storage unit 12, and clears the erase command of the temporal invalidation-determination-information storage unit 16.

Finally, in STEP S38, the screen display processing unit 18 returns the changes in the icon, display color, font style, and the like of the machining-program row number corresponding to the operation information to the original states. The other processes are the same as those of the second and third embodiments.

According to the fourth embodiment, in a case of changing the machining program, the original point for materials, or the like after setting is performed such that a collision determination on a predetermined portion of the machining program is invalidated, since the operation information for invalidating the collision determination stored in the machining-information storage unit 12 is erased, the collision determination is validated. Therefore, even if the same machining program is performed again, interference of a machine and a tool, a tool and another tool, a tool and a jig, a tool and a material, or other elements is prevented such that the tools and the machine are not damaged

INDUSTRIAL APPLICABILITY

The NC device of the present invention can be appropriately used for NC devices for performing an interference check of a machining program during test cutting or first machining.

DESCRIPTION OF REFERENCE NUMERALS AND SYMBOLS

1 NC DEVICE
2 DISPLAY UNIT
11 SETUP-INFORMATION STORAGE UNIT
12 MACHINING-INFORMATION STORAGE UNIT
121 MACHINING PROGRAM
122 MACHINING-CONDITION INFORMATION FILE
13 MACHINING-INFORMATION ANALYZING UNIT
14 INTERPOLATING UNIT
141 COLLISION DETERMINING UNIT
142 COLLISION-DETERMINATION PROCESSING UNIT
143 ENTRY PROHIBITED AREA
15 INPUT DEVICE UNIT
151 OPERATION-CONTINUATION INSTRUCTING UNIT
152 COLLISION-DETERMINATION INVALIDATION INSTRUCTING UNIT
16 TEMPORAL INVALIDATION-DETERMINATION-INFORMATION STORAGE UNIT
17 OPERATION-INFORMATION PROCESSING UNIT
18 SCREEN DISPLAY PROCESSING UNIT

The invention claimed is:
1. A numerical control device having a function of preventing machine collision, the numerical control device comprising:
a collision determining unit that detects a possibility of collision between a machine and an area set as an entry prohibited area;
an operation-continuation instructing unit that instructs whether to continue an operation when the collision determining unit detects the possibility of collision and shaft movement is temporarily stopped;
a machining-information storage unit that stores internal operation information of the numerical control device regarding the temporary stop when the operation-continuation instructing unit instructs continuation of the operation; and
a collision-determination processing unit that invalidates a collision determination on the basis of the operation information stored in the machining-information storage unit when executing the same machining program the next and subsequent times, a collision-determination invalidation command for invalidating a collision determination of a corresponding program row of the machining program in which the possibility of machine collision has been detected; or any one of a kind of interference check, current position coordinates of each shaft and original point information, which includes at least a machining-program row number of a corresponding program row of the machining program in which the possibility of machine collision has been detected.

2. The numerical control device according to claim 1, further comprising:

a screen display processing unit that displays a portion of the machining program in which the collision determination has been invalidated such that the portion is distinguished from the other portions by at least one or a combination of an icon, a display color and a font style.

3. The numerical control device according to claim 1, further comprising:

an erasing unit that automatically erases the operation information stored in the machining-information storage unit when any one of a machining program including a portion in which the collision determination has been invalidated, a tool corresponding to the machining program, a jig corresponding to the machining program and an original point coordinate corresponding to the machining program is changed.

4. The numerical control device according to claim 1, wherein the collision-determination processing unit has a function of invalidating the collision determination according to a kind of interference check.

5. The numerical control device according to claim 1, further comprising:

a temporal invalidation-determination-information storage unit that stores operation information of a machining program portion in which continuation of the operation is determined to be possible during start to end of the operation; and an operation-information processing unit that writes the operation information stored in the temporal invalidation-determination-information storage unit into the machining-information storage unit at once when the operation of the machining program is terminated.

6. The numerical control device according to claim 1, further comprising:

a temporal invalidation-determination-information storage unit that stores operation information of a machining program portion in which continuation of the operation is determined to be possible each time the possibility of machine collision is detected and the operation is temporarily stopped; and an operation-information processing unit that writes the operation information in the machining-information storage unit each time the operation information is stored in the temporal invalidation-determination-information storage unit.

* * * * *